Figure 1:
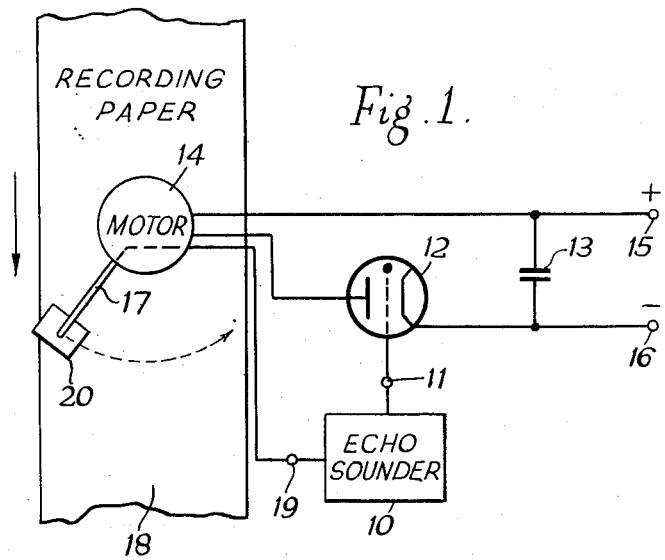

April 24, 1962    W. HALLIDAY ETAL    3,031,251
IMPULSE DRIVEN SWEEP RECORDER
Filed July 14, 1959    4 Sheets-Sheet 1

INVENTOR
W. HALLIDAY, W.G. HASLETT
J.E.L. SOTHCOTT
BY
Moon and Hall
ATTORNEY.

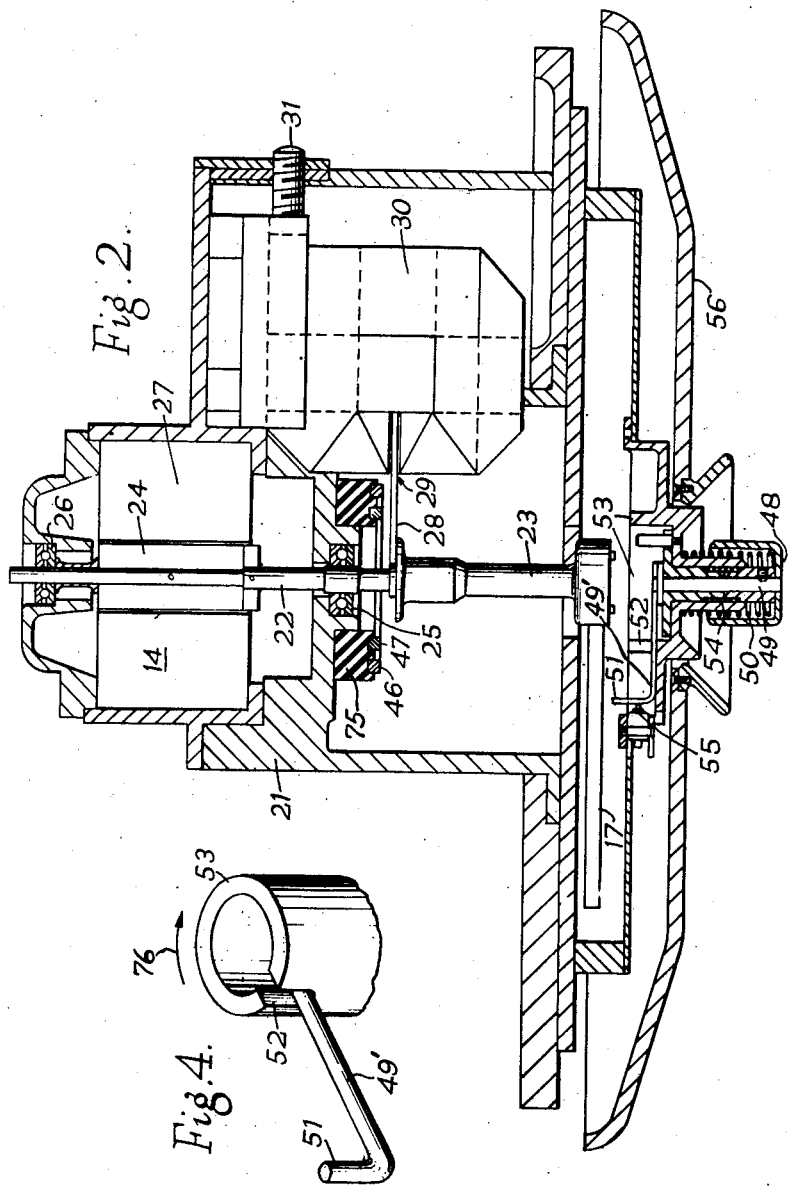

April 24, 1962  W. HALLIDAY ETAL  3,031,251
IMPULSE DRIVEN SWEEP RECORDER
Filed July 14, 1959  4 Sheets-Sheet 3
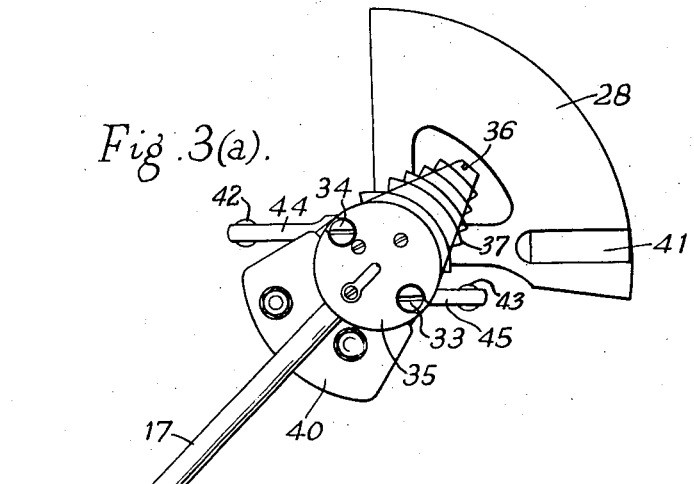
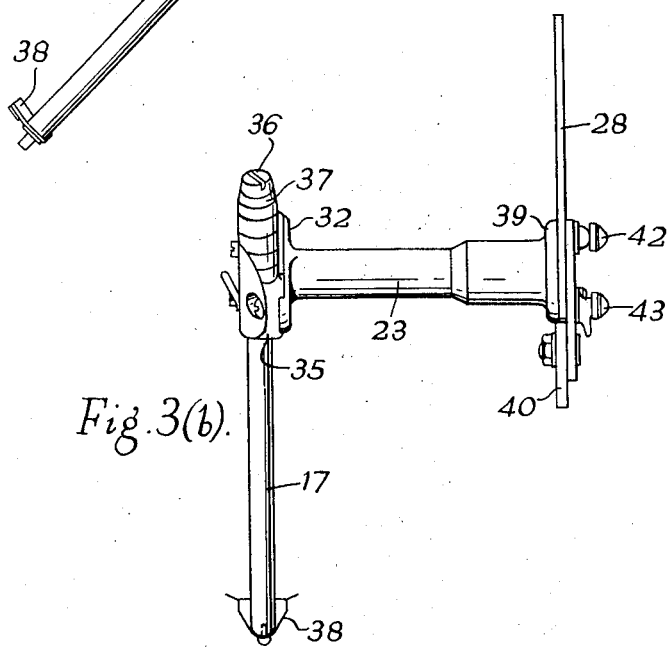
INVENTOR
W. HALLIDAY, W.G. HASLETT
J.E.L. SOTHCOTT
BY
Moore and Hall
ATTORNEY.

United States Patent Office 3,031,251
Patented Apr. 24, 1962

3,031,251
IMPULSE DRIVEN SWEEP RECORDER
William Halliday, Roy William George Haslett, and John Ernest Leon Sothcott, all % Husun Works, New North Road, Barkingside, Essex, England
Filed July 14, 1959, Ser. No. 827,101
Claims priority, application Great Britain July 16, 1958
9 Claims. (Cl. 346—139)

The present invention relates to recording apparatus, such as pen-recorders, of the type in which means are provided for sweeping a recording element (hereinafter referred to as a stylus) in an arc over a recording medium upon which, in operation, the stylus produces a record of applied signals, the sweep of the stylus across the recording medium providing a time-base.

The record may, for example, be intensity-modulated by the applied signals, and may be made by a stylus moving in contact with or spaced from the recording medium. Possible methods of recording include not only drawing the record in ink but also photographic, electrostatic, and electrochemical methods.

It is an object of the invention to produce accurate recording apparatus of the type specified suitable for recording signals of short duration, of the order of milliseconds in such a manner that they may be correlated even when, occurring at irregular intervals.

For example, in the specification of our co-pending application Ser. No. 560,820, filed January 23, 1956, there is described echo-sounding apparatus for the detection of shoals of fish in which pulses of ultrasonic waves are emitted and a cathode ray tube is used to display echo signals from within a range of five fathoms above the sea bottom, the echo signals being first magnetically recorded on a rotating drum and later displayed when a triggering signal derived from an echo from the sea bottom initiates the sweep of a time-base circuit of the cathode ray tube. The duration of the recorded echo signals is about 12 milliseconds, corresponding to the time of travel of the ultrasonic waves through 10 fathoms of water, this being the path difference between echoes from the limits of the 5 fathom range. The time of arrival of the bottom echo producing the triggering signal is uncertain since it is determined by the depth of water below the ship, which may be about 300 fathoms for example and will vary with vertical movement of the ship and irregularities in the sea bed.

The cathode ray tube is ideally suited to the display of such echo signals since it responds substantially immediately to the triggering signal and a full sweep of the time base is easily completed in the time of 12 msec., so that the echoes from a 5-fathom range are expanded to fill the whole of the screen. However the display is necessarily of a temporary nature since it must give way to a new display at frequent intervals. In attempting to produce a permanent record of the echo signals the inertia of known forms of recording apparatus causes difficulties. In order to produce a satisfactory record of such echo signals on recording apparatus of the type specified certain important conditions must be fulfilled:

The stylus must travel an appreciate distance over the recording medium in a time of the order of milliseconds in order to record the details of the applied echo signals. It must start from a well-defined zero position with as small a time lag as possible, and one which is constant.

According to the present invention there is provided recording apparatus of the type specified, having stylus positioning means adapted releasably to hold the stylus in a predetermined zero position, means for producing, in response to a triggering signal, a pulse of current of a duration shorter than the duration of a single time-base sweep of the stylus, dynamo-electric means responsive to an applied pulse to apply torque to a member carrying the stylus, the force communicated to the stylus-carrying member by the dynamo-electric means being adapted to overcome the force exerted by the retaining means and sweep the stylus across the recording medium, and means adapted to restore the stylus to the zero position after the execution of a time base sweep.

Figure 6:
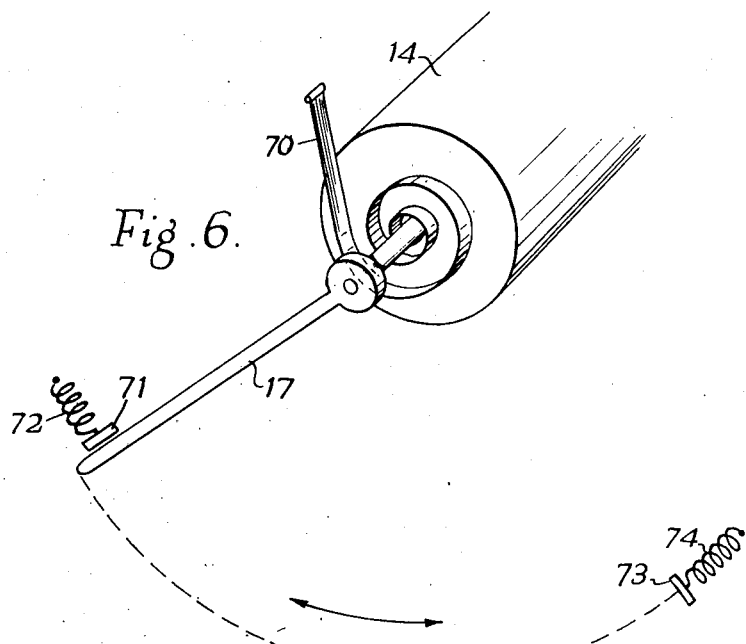
Figure 5B:
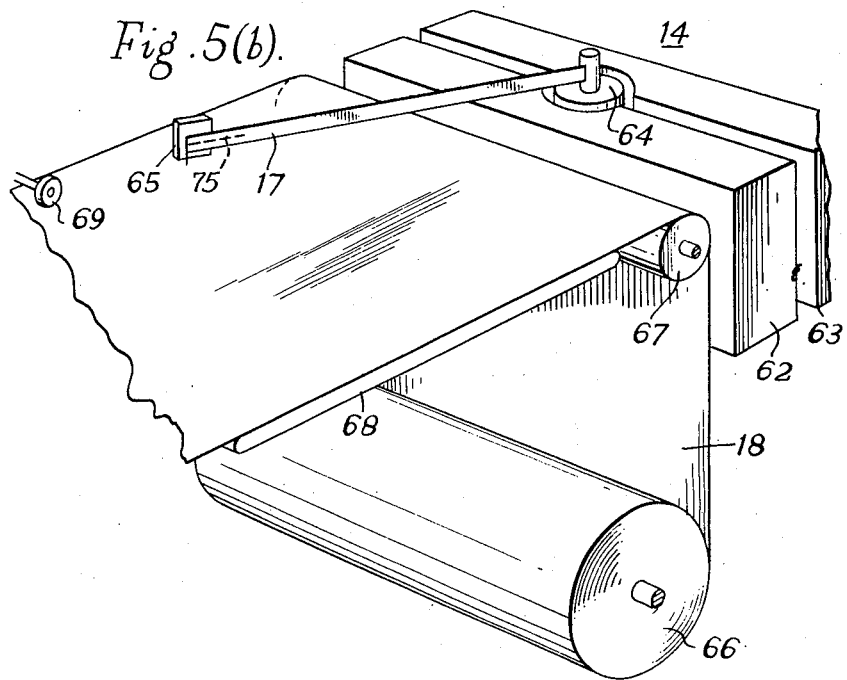
Figure 5A:
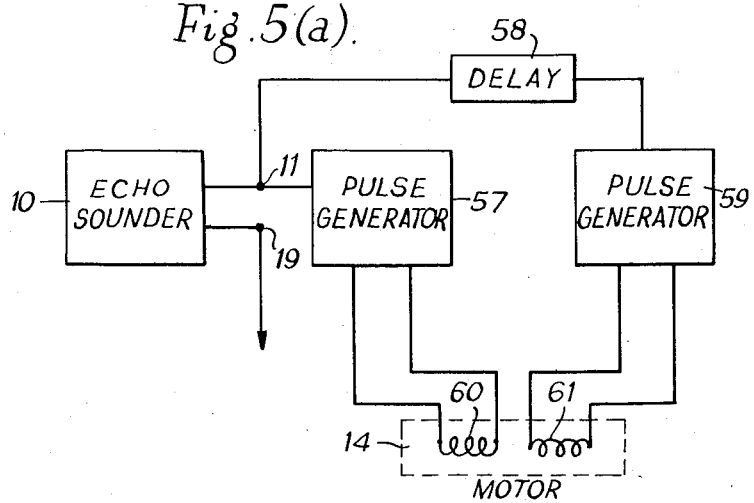

The invention will now be described, by way of example, with reference to the accompanying drawings, in which:

FIG. 1 is a schematic diagram of an echo sounder and associated recording apparatus, FIG. 2 is a plan, in cross-section, of part of the arrangement shown in FIG. 1, FIGS. 3(a), 3(b) and 4 show details of FIG. 2, FIG. 5(a) is a schematic circuit diagram of alternative recording apparatus for use with an echo sounder, FIG. 5(b) is a schematic perspective view of mechanism for use in the circuit of FIG. 5(a), and FIG. 6 is a schematic diagram of yet further recording apparatus for use with an echo sounder.

In FIG. 1 echo sounding apparatus 10 has one output terminal 11 connected to the trigger electrode of a gas-filled trigger triode 12 so connected as to control the discharge of a capacitor 13 through the winding of a moving iron impulse motor 14.

The capacitor 13 is normally charged from an electric supply (not shown) connected to two supply terminals 15 and 16.

A trigger pulse applied from the echo sounding apparatus 10 to the trigger tube 12 causes the latter to strike and hence to discharge the capacitor 13 through the motor 14.

The motor 14 rotates a stylus arm 17 carrying a stylus (not shown) over a strip 18 of recording paper moved vertically downwards at a slow rate past the stylus. The stylus is connected through the stylus arm 17 and a terminal 19 to the echo sounding apparatus 10 and it is arranged that echo signals to be recorded appear at the terminal 19 and are recorded by the stylus on the paper 18 as the stylus sweeps over the paper.

The stylus arm is normally in a rest position as shown in FIG. 1 and when in this position the stylus engages the surface of a chromium-plated, stainless steel strip 20 protecting the paper 18.

The timing of the trigger pulses applied to the trigger tube 12 is determined by the range of depths from which echo signals are to be recorded.

The motor 14, the stylus arm 17 and associated mechanism will now be described in more detail with reference to FIGS. 2, 3(a), 3(b), and 4.

In FIG. 2 a main housing 21 houses the moving iron motor 14 to the shaft 22 of which is attached a further shaft 23 carrying the stylus arm 17 and its associated stylus (not shown).

The motor 14 has a moving iron armature 24 of laminated form supported by means of two ball bearings 25 and 26 between the poles of a stator provided with a winding 27, this being the winding through which the capacitor 13 of FIG. 1 is discharged.

The shaft 23 carries, in addition to the stylus arm 17 an aluminium vane 28 which moves into and out of a gap 29 between the poles of a permanent magnet 30. The position of this magnet radially of the shaft 23 can be adjusted under the control of a screw 31.

Referring now to FIGS. 3(a) and 3(b) these show in end view and elevation respectively the shaft 23 with its attached stylus arm and vane in more detail.

The left-hand end in FIG. 3(b) of the shaft 23 carries the stylus arm 17 which is affixed to a boss 32 by two screws 33 and 34 (FIG. 3(a)) and a clamp 35.

The stylus arm is hollow and the clamped end is internally threaded to receive the thread of a screw 36 holding in place a number of lead balance weights 37. A stylus holder 38 is carried by the other end of the stylus arm 17.

The right-hand end (in FIG. 3(b)) of the shaft 23 has a further boss 39 to which the vane 28 is affixed. A balance weight 40 is provided for the vane 28.

Embedded in the vane 28 is a small ceramic permanent magnet 41 at the position shown in FIG. 3(a), the magnet 41 being preferably composed of a suitable ferrite or a sintered oxide containing iron and completely shrouded by the aluminium of vane 28.

A pair of electrical contact members 42 and 43 carried by resilient arms 44 and 45 on the boss 39 are also provided.

Referring again to FIG. 2 the contacts 42 and 43 of FIG. 3 (not shown in FIG. 2 for clarity) bear against two slip rings 46 and 47 respectively which are embedded in an annulus 75 of insulating material carried by the housing 21.

Through these slip rings and contacts electrical connections are made from the echo sounding apparatus 10 of FIG. 1, one connection being from the terminal 19 of FIG. 1 to apply signals to be recorded to the stylus and the other (not shown in FIG. 1) being to a grounding switch which is operated whenever the stylus is within ±4° of its normal zero position. The ground on the stylus can be used to ensure triggering only when the stylus is at or near its zero position and secondly to effect gating of the signals to be recorded so that they are applied to the stylus only when the stylus is moving over the paper.

In operation the zero or rest position of the stylus arm is determined by the magnet 41 of FIG. 3(a) which is located in the gap 29 (FIG. 2) between the poles of the permanent magnet 30. These poles are so shaped as to ensure accurate location of the magnet 41 and hence the stylus arm 17.

On the discharge of the capacitor 13 (FIG. 1) through the stator winding 27 the torque provided by the motor 14 is sufficient to overcome the magnetic attraction between the magnets 30 and 41 and set the shaft 23 and hence the stylus arm 17 rotating. The duration of the pulse of current through the stator winding 27 is arranged to be shorter than the time taken for the stylus to sweep over the paper and hence at the end of the pulse rotation continues under the momentum gained during the application of the pulse.

The zero position of the vane is determined by the magnet 41 which is in the trailing end of the vane. Thus in operation the whole of the vane passes out of the gap 29.

As soon as the leading edge of the vane approaches and enters the gap 29 on rotation by the applied pulse eddy currents induced in the vane have a braking effect and rapidly reduce the speed of rotation until finally the magnetic fields of the two magnets interact and restore the vane and hence the stylus to the zero position. Oscillation about the zero position is substantially prevented by the eddy currents induced in the aluminium overlying the magnet 41.

Adjustment of the degree of braking provided by the vane can be made by means of the adjusting screw 31.

The magnets are such that the stylus is always restored to its zero setting whenever the stylus arm is within ±20° of the zero setting.

Mechanism will now be described whereby the stylus arm can be reset to its zero setting manually in the rare event of it coming to rest at an angular position outside the ±20° limit. This may, for example, occur during transit.

This mechanism is located in front of the stylus arm and comprises a hollow knob 48 carrying a shaft 49 fixed internally in a coaxial position.

The knob is urged outwardly by means of a helical spring 50 and pulls the shaft 49 with it. The inner end of the shaft 49 carries a rod 49' with a cranked end 51 positioned adjacent the stylus arm. Retraction by the spring normally keeps the end 51 of the rod 49' clear of the stylus arm and when in this position the rod passes through a slot 52 in an annulus 53. Clockwise rotation of the knob is prevented by a one-way spring clutch 54.

In operation to reset the stylus arm to its zero setting the knob is pushed until the rod 49' is clear of the slot 52 and can slide over the surface of the annulus 53.

The knob is then rotated in an anti-clockwise direction the end 51 of the rod engaging the stylus arm which is rotated correspondingly. The slot 52 is in a position corresponding to the zero setting of the stylus arm and when the rod again reaches this slot the spring 50 urges the rod into the slot leaving the stylus in its zero setting ready for operation.

When the rod is in position in the slot 52 it actuates a switch 55 which controls the triggering of the motor and the application of signals to the stylus. Movement of the rod out of the slot 52 opens the switch and prevents recording during resetting.

A dished shield 56 guards the recording paper which moves vertically downwards past the stylus.

A perspective view of the rod 49' in the slot 52 in the annulus 53 is shown in FIG. 4 as viewed from the direction of the motor 14. Depression of the knob moves the rod out of the slot 52 and enables it to be moved along the surface of the annulus 53 in the direction of the arrow 76.

Referring now to FIG. 5(a), echo sounding apparatus 10 is provided with output terminals 11 and 19 as in FIG. 1, pulses being provided at the terminal 11 to control the movement of the recording stylus arm 17 (FIG. 5(b)) and signals to be recorded being provided at the terminal 19. The pulses appearing at the terminal 11 are applied on the one hand to a pulse generator 57 which generates an amplified current pulse, and on the other hand through a delay device 58 to a further pulse generator 59 which also generates an amplified current pulse.

The motor 14 has two armature windings 60 and 61 to which the pulses from the generators 57 and 59 respectively are applied. The winding 61 is reversed relative to the winding 60 and by arranging the pulses to be of the same polarity rotation is effected first in one sense and then in the other by the two pulses.

Referring now to FIG. 5(b) the motor 14 comprises a permanent magnet with its pole pieces 62 and 63 spaced from one another and accommodating an armature 64 in the gap. The armature 64 includes the two windings 60 and 61 (not shown in FIG. 5(b)).

The stylus arm 17 is affixed to the armature and hence is rotated thereby and is normally held in a zero position by means of a fixed magnet 65, the stylus arm being hollow and having a ferro-magnetic wire 75 therein.

A pulse of a duration shorter than the time base is applied to the winding 60 and "kicks" the stylus arm away from the magnet 65. The momentum so given to the stylus arm carries it over the recording paper 18 which is wound from a feed roller 66, over a guide roller 67 and a platen 68, traction being applied by a drive roller 69.

The timing of the next succeeding pulse from the generator 59 is arranged to coincide with the end of the sweep of the stylus arm and serves to return the stylus arm to its zero position in which it is held by the magnet 65. Appropriate adjustment of the amplitudes of the pulses ensures satisfactory operation.

Yet another embodiment of the invention is shown in FIG. 6. The motor 14 is a moving iron impulse motor as in FIG. 1 and is provided with a helical spring 70 tending to drive the motor shaft in a direction such that the stylus arm 17 is normally held against spring-mounted buffer 71. The spring mounting is shown schematically at 72 and consists of a damped spring.

An impulse applied from echo sounding apparatus to the motor overcomes the force provided by the helical spring 70 and sweeps the stylus 17 over its recording track. The momentum of the stylus arm carries it to the end of its time base sweep where its motion is arrested by a second buffer 73 mounted upon a damped spring 74.

The helical spring 70 ensures restoration of the stylus arm 17 to its zero position.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. Recording apparatus comprising a recording medium, a recording element, an arm carrying said recording element, electromagnetic drive means comprising a rotor mechanically coupled to said arm to sweep said recording element across the recording medium from a zero position to an end position, means responsive to applied signals to be recorded to cause said recording element to mark said recording medium during the time-base sweep of said recording element from the zero position to the end position, positioning means for releasably holding the recording element in the zero position, a control circuit coupled to said drive means to apply a current pulse thereto in response to a triggering signal, said current pulse having a duration shorter than the duration of the time-base sweep of the recording element and the momentum communicated to the arm by the drive means as a result of the application of the current pulse being sufficient to overcome the force exerted by the positioning means and sweep the recording element across the recording medium, and restoring means for restoring the recording element to its zero position after the execution of each time-base sweep.

2. Recording apparatus according to claim 1, wherein the arrangement is such that, in operation, the stylus is restored to its zero position by reversal of its direction of motion.

3. Recording apparatus according to claim 2, wherein reversal of motion of the stylus is effected by a circuit adapted to apply to the dynamo-electric means a reversing pulse delayed relative to an operating pulse.

4. Recording apparatus according to claim 2, wherein for the purpose of reversing the motion of the stylus a return spring is provided applying a bias to the stylus-carrying member tending to return it to its zero position.

5. Recording apparatus as claimed in claim 1 in which the arm carrying the recording element returns to its zero position by continued rotation in the same direction after completion of the time-base sweep, the restoring means comprising a vane coupled to the arm and a fixed magnet arranged to exert an eddy current braking effect on the vane and the positioning means comprising the fixed magnet and a cooperating magnet carried by the vane.

6. Recording apparatus as claimed in claim 1 in which said arm comprises magnetic material and said positioning means include a fixed magnet cooperating with the arm to exert a maximum retaining force thereon at the zero position.

7. Recording apparatus as claimed in claim 1 in which said restoring means comprise means for reversing the direction of motion of the recording element on completion of each time-base sweep.

8. Recording apparatus as claimed in claim 7 in which said control circuit comprises means for applying to the said drive means a second current pulse delayed relative to the first and in opposite sense thereto, whereby to reverse the motion of the stylus.

9. Recording apparatus as claimed in claim 7 in which the restoring means comprise a return spring arranged to apply a bias to the arm carrying the recording element to restore said recording element to its zero position and a buffer mounted at the zero position and acting in opposition to the return spring while the arm is in contact with the buffer.

References Cited in the file of this patent

UNITED STATES PATENTS

| 2,066,131 | White | Dec. 29, 1936 |
| 2,331,205 | Lenehan | Oct. 5, 1943 |
| 2,412,234 | Turner | Dec. 10, 1946 |
| 2,673,137 | Dubusc | Mar. 23, 1954 |
| 2,879,478 | Riesz | Mar. 24, 1959 |

FOREIGN PATENTS

| 548,104 | Germany | Apr. 7, 1932 |